US012220082B2

(12) United States Patent
Vaupot

(10) Patent No.: US 12,220,082 B2
(45) Date of Patent: Feb. 11, 2025

(54) ADVANCED AIR FRYER

(71) Applicant: KONINKLIJKE PHILIPS N.V., Eindhoven (NL)

(72) Inventor: Jan Vaupot, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/268,123

(22) PCT Filed: Dec. 14, 2021

(86) PCT No.: PCT/EP2021/085771
§ 371 (c)(1),
(2) Date: Jun. 16, 2023

(87) PCT Pub. No.: WO2022/129100
PCT Pub. Date: Jun. 23, 2022

(65) Prior Publication Data
US 2024/0049909 A1    Feb. 15, 2024

(30) Foreign Application Priority Data
Dec. 18, 2020 (EP) ..................................... 20215257

(51) Int. Cl.
*A47J 37/06* (2006.01)
(52) U.S. Cl.
CPC ................................. *A47J 37/0641* (2013.01)
(58) Field of Classification Search
CPC ...... A47J 36/06; A47J 27/004; A47J 27/0802; A47J 27/09; A47J 37/0641; A47J 43/044; A47J 2043/0449; A47J 27/00; A47J 27/08; A47J 27/092; A47J 36/025; A47J 36/08; A47J 36/10; A47J 36/12; A47J 36/18; A47J 36/20; A47J 36/22; A47J 37/00; A47J 37/12; A47J 37/1204; A47J 37/1209; A47J 37/1214; A47J 537/1219; A47J 537/1266;
(Continued)

(56) References Cited

U.S. PATENT DOCUMENTS

| 4,848,318 A | 7/1989 | Brewer |
| 6,283,726 B1 | 9/2001 | Fackelmann et al. |
| 2003/0164096 A1 | 9/2003 | Gruhbaum et al. |

(Continued)

FOREIGN PATENT DOCUMENTS

| CN | 110916522 A | 3/2020 |
| EP | 3162259 A1 | 5/2017 |

(Continued)

OTHER PUBLICATIONS

Extended European Search Report issued in connection with corresponding EP Application No. 20215257.5 dated May 31, 2021.

*Primary Examiner* — Phuong T Nguyen
(74) *Attorney, Agent, or Firm* — Maschoff Brennan

(57) ABSTRACT

There is provided an air-based fryer including a housing defining a cooking chamber; a basket for supporting food items to be cooked, and to be mounted in the cooking chamber during a cooking operation; an air guiding element located above the basket; an air mover for circulating air within the cooking chamber, such that air is directed towards the air guiding element and then guided downwards by the air guiding element through the basket; and a heater for heating the air circulated by the air mover.

13 Claims, 11 Drawing Sheets

(58) Field of Classification Search
CPC ... A47J 37/1285; A47J 37/129; A47J 37/1295
USPC ....... 219/432, 400, 433, 436, 438, 442, 472,
219/474, 524, 525, 521; 99/348, 353,
99/372, 376, 324, 325, 330–343, 369,
99/400–418, 422, 425, 426, 430, 440,
99/444, 447, 448, 449, 451, 483, 495,
99/501
See application file for complete search history.

(56) References Cited

U.S. PATENT DOCUMENTS

| | | |
|---|---|---|
| 2016/0174764 A1 | 6/2016 | Xiao |
| 2018/0035698 A1* | 2/2018 | McNerney ................ A23L 5/17 |
| 2018/0271323 A1 | 9/2018 | Zhang et al. |

FOREIGN PATENT DOCUMENTS

| | | |
|---|---|---|
| GB | 416157 A | 9/1934 |
| JP | 2011052623 A | 3/2011 |
| WO | 2015081549 A1 | 6/2015 |
| WO | 2016165198 A1 | 10/2016 |
| WO | 2017178739 A1 | 10/2017 |

* cited by examiner

ADVANCED AIR FRYER

CROSS-REFERENCE TO RELATED APPLICATIONS

The present application is a U.S. National Phase application under 35 U.S.C. § 371 of International Application No. PCT/EP2021/085771, filed on Dec. 14, 2021, which claims the benefit of European Patent Application No. 20215257.5, filed on Dec. 18, 2020. This application is hereby incorporated by reference herein.

FIELD OF THE INVENTION

The present invention relates to the field of cooking apparatuses, and more specifically to an air-based fryer.

BACKGROUND OF THE INVENTION

Cooking apparatuses, such as air-based fryers, are used to cook food items, such as pieces of meat, fish, and vegetables, by circulating hot air around the food items. Air fryers typically comprise a fan for circulating the air and a heating element for heating the air being circulated. The food items are typically supported by a basket in the air fryer. Air fryers provide healthier cooking than traditional deep fryers since the food items are not submerged in oil.

Known air-based fryers typically encounter issues with achieving homogeneous cooking of all the food items within the fryer. When cooking certain food items, it can be necessary to periodically stop the cooking process and shake or agitate the food items in order to achieve even cooking. This can require additional work by the user and can lead to longer cooking times.

Another problem encountered by air-based fryers is the unwanted generation of smoke during use. Typical air-based fryers use fans rotating at high speeds to achieve short cooking times. However, the high-speed air circulated by these fans can cause oil and fat from the food to be blown onto the heating element, generating smoke.

There is a need to develop an improved air-based fryer to alleviate at least some of the aforementioned problems.

WO 2015/081549 discloses a multifunctional vessel for cooking food, having a thermal convection fan. In one example, the air inlet to the cooking chamber is at the top and delivers the air downwardly.

SUMMARY OF THE INVENTION

The present invention provides an air-based fryer which seeks to provide improved airflow through food items in a cooking process. The invention is defined by the claims.

According to a first specific aspect, there is provided an air-based fryer comprising: a housing defining a cooking chamber; a basket for supporting food items to be cooked, and configured to be mounted in the cooking chamber during a cooking operation; an air guiding element located above the basket; an air mover for circulating air within the cooking chamber, such that air is directed towards the air guiding element and then guided downwards by the air guiding element through the basket; and a heater for heating the air circulated by the air mover.

The air mover comprises a fan. The fan comprises a base plate; a circumferential side wall extending axially from an upper surface of the base plate; and a plurality of fan blades. In a cooking operation, the basket may be configured to be at least partially mounted within the volume formed by the base plate and the side wall of the fan.

All or some of the plurality of fan blades may be formed in the side wall and arranged circumferentially around the axis of the fan. The fan may further comprises an air guide ring radially inward of the fan blades. The air guide ring may comprise a plurality of openings configured to direct air flow radially outward to the fan blades.

The air guide ring comprises a plurality of circumferential fins arranged axially along the length of the air guide ring. Each opening may be formed between adjacent fins. Each fin may extend at an angle relative to the axis of the ring. The plurality of fins may be arranged such that fins closer to the base plate extend at a greater angle relative to the axis of the ring than fins further from the base plate.

Openings closer to the base plate may have a greater cross-sectional area than openings further from the base plate.

All or some of the plurality of fan blades may be formed on a lower surface of the base plate, the lower surface being opposed to the upper surface of the base plate. The fan blades may be arranged symmetrically. The fan blades may extend between an inner part and an outer part of the lower surface of the base plate.

The base plate may further comprise a plurality of ventilating openings extending from the upper surface to the lower surface to direct air flow downward from the basket to the fan blades.

The heater may comprise at least one heating element arranged around the fan. The at least one heating element may extend around the circumference of the fan. The at least one heating element may comprise one of a wire heating element, a tubular heating element and a coiled heating element.

The air guiding element may comprise a plurality of air-deflecting arms. The air-deflecting arms may be arranged symmetrically. The air-deflecting arms may extend in a horizontal plane between an inner part and an outer part of said air guiding element.

The housing may comprise a lid which can be opened in order to place food items inside the cooking chamber, and closed to seal the cooking chamber. The air guide element may be formed on an inner surface of the lid.

The upper surface of the base plate may be tapered such that the upper surface slopes downward from the centre of the base plate to the side wall.

According to another aspect, there is provided an air-based fryer comprising:
  a housing defining a cooking chamber;
  a basket for supporting food items to be cooked, and configured to be mounted in the cooking chamber during a cooking operation;
  an air guiding element located above the basket;
  an air mover for circulating air within the cooking chamber, such that air is directed towards the air guiding element and then guided downwards by the air guiding element through the basket; and
  a heater for heating the air circulated by the air mover, wherein the air guiding element comprises a plurality of air-deflecting arms.
  The air deflecting arms are preferably arranged symmetrically and preferably they extend in a horizontal plane between an inner part and an outer part of said air guiding element.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which:

FIG. 5b is a cross-sectional view of the example fan as illustrated in FIG. 5a;

DETAILED DESCRIPTION OF EMBODIMENTS

Figure 1:
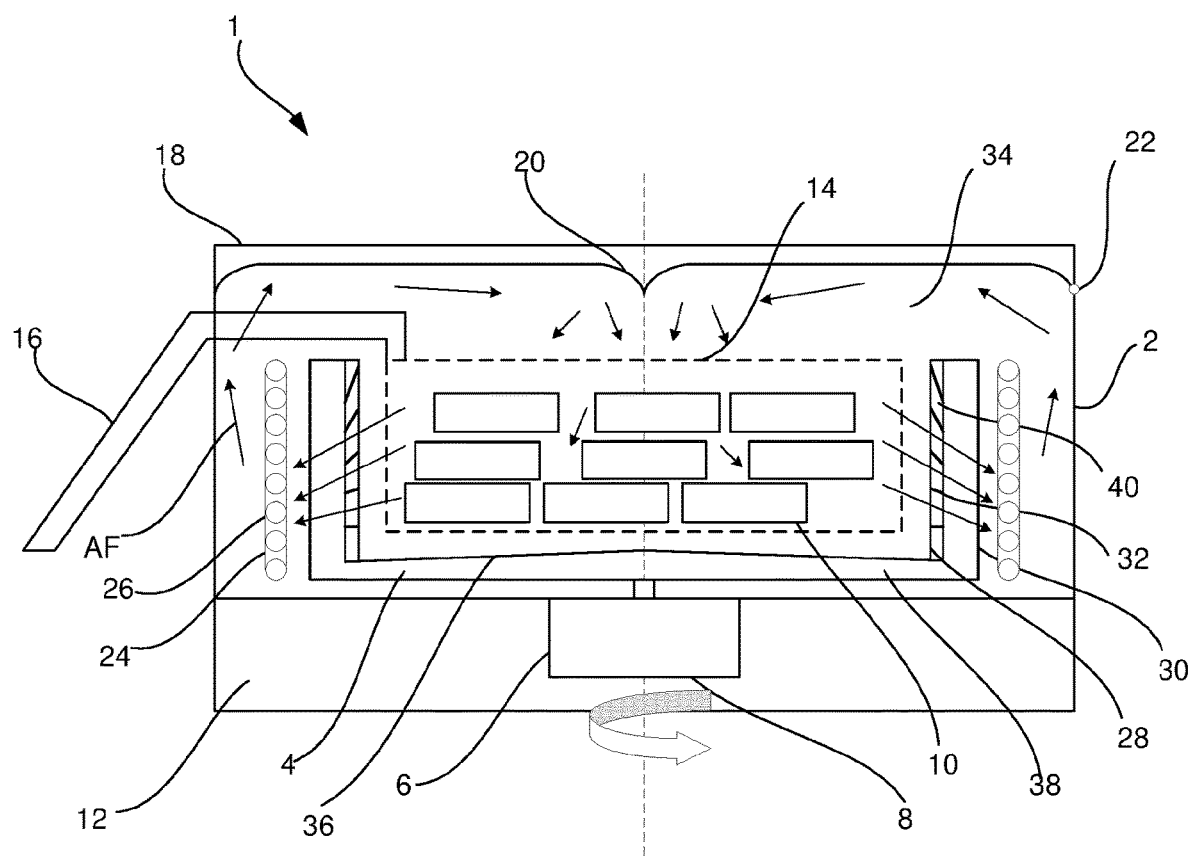
FIG. 1 is a cross-section of an example air-based fryer according to a first embodiment of the invention.

FIG. 1 shows an air-based fryer 1 according to a first embodiment of the present invention. The fryer 1 comprises a housing 2. A cooking chamber 34 is defined by the housing 2. The housing 2 further comprises a lid 18 which can be opened to allow food items 10 to be placed within the cooking chamber 34 and closed to seal the cooking chamber 34. In this example, the lid 18 is coupled to the housing 2 via a hinge 22. In other examples, the lid 18 may have an alternative mechanism for coupling to the housing 2, for example via a push fit. The lid 18 may be formed from a transparent material.

The fryer 1 comprises a basket 14 for supporting food items 10 to be cooked. The basket 14 is air permeable to allow circulating air to pass through. For example, the basket 14 may be formed from a mesh-type material. The basket 14 may be removable from the fryer 1. The basket 14 comprises a handle 16 to allow a user to lift the basket 14 in and out of the fryer 1. During a cooking operation, food items 10 may be loaded into the basket 14 and the basket 14 may be mounted in the cooking chamber 34 of the fryer 1.

Figure 5A:
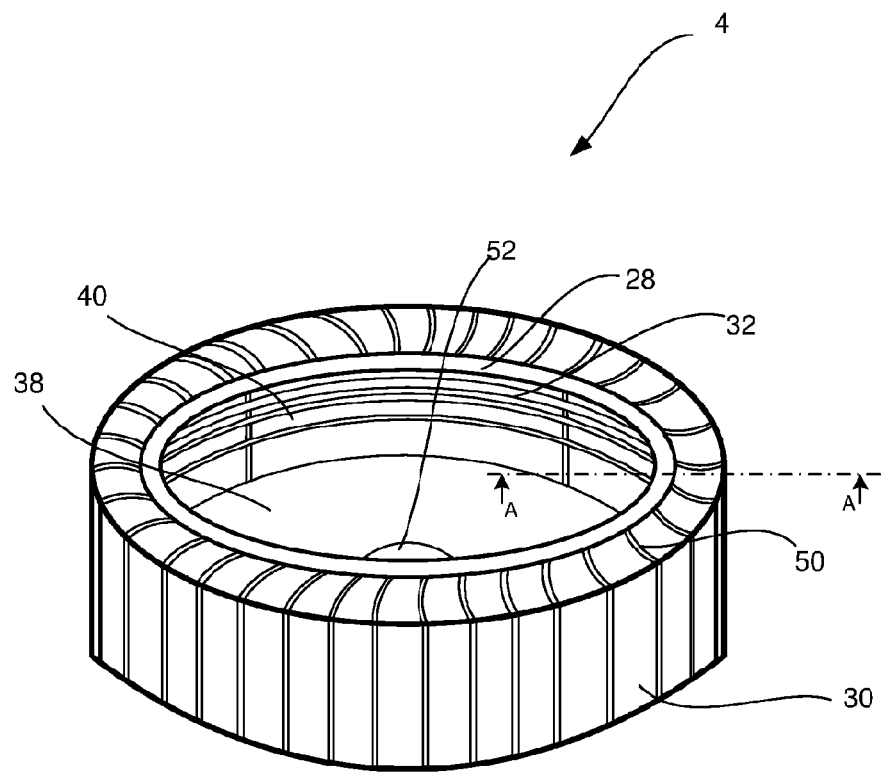
FIG. 5a shows a three-dimensional view of an example fan used in the first embodiment of the invention.
Figure 5B:
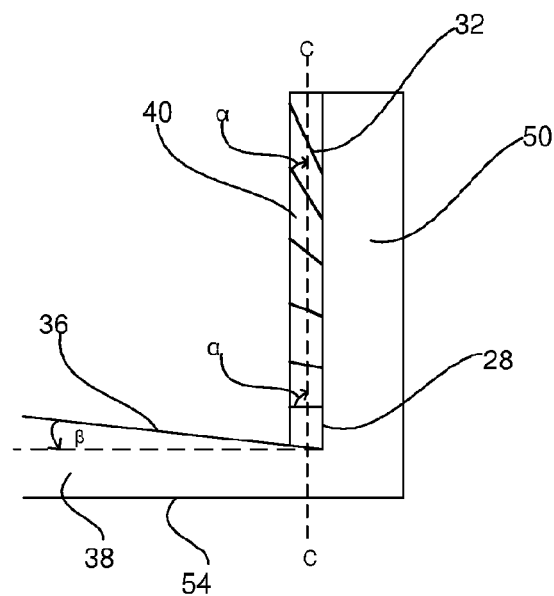

The fryer 1 comprises an air mover for circulating air within the cooking chamber. In this example, the air mover is a fan 4 configured to rotate about a central axis. The fan 4 may be a radial or centrifugal fan. The fan 4 has a pan-like shape, comprising a base plate 38 and a side wall 30 extending axially upwards from the base plate 38. The side wall 30 extends around the circumference of the base plate 38. The fan 4 comprises a plurality of fan blades 50 (as shown in FIGS. 5a and 5b). The plurality of fan blades 50 are arranged in the side wall 30 of the fan 4 and are symmetrically arranged around the central axis. The fan 4 further comprises an air guide ring 28 located radially inward of the side wall 30. The air guide ring 28 comprises a plurality of openings 40 which are configured to guide airflow toward the fan blades 50.

The fryer 1 comprises a drive mechanism configured to provide rotational movement to the fan 4. In this example, the drive mechanism comprises a motor 6. The fan 4 is coupled to a drive shaft 8 of the motor 6. The motor 6 may be housed in a compartment 12 separate and sealed off from the cooking chamber 34. The fan 4 may be detachably connected to the drive shaft 8 of the motor 6 so that the fan 4 can be removed from the fryer 1 by the user for cleaning. For example, the fan 4 may be attached to the drive shaft 8 using a snap-fit connection, a wing nut and bolt, or a screw-on connection.

The fryer 1 has a heater 24 to heat the air circulated by the fan 4. The heater 24 comprises at least one heating element 26. The at least one heating element 26 may be arranged around the outside of the fan 4. In this example, the heating element 26 extends around the circumference of the fan 4. In other examples, a plurality of heating elements 26 may be arranged at different positions around the outside of the fan 4. This enables heat to be distributed evenly throughout the cooking chamber 34. In an example, the heating element 26 may comprise a wire heating element. The wire heating element provides efficient heat transfer to air and minimises heater temperatures. In other examples, a coil heating element or a tubular heating element may be used.

The fan 4 has a larger diameter than the basket 14 such that the basket 14 can be at least partially mounted within the internal volume of the fan 4, which is formed by the base plate 38 and the side wall 30 of the fan 4. The volume formed by the base plate 38 and side wall 30 of the fan is larger than the basket, such that during a cooking operation, a high amount of airflow may pass through the basket 14 to the food items 10 to achieve uniform cooking. By mounting the basket 14 within the internal volume of the fan 4, residue, including fat and oil, from the food items 10, may be collected on the upper surface 36 of the base plate 38. Conventional air-based fryers typically have a drip tray located below a food-supporting basket to collect residue. The fan 4 of the present disclosure performs both the function of the fan and the drip tray. This enables the number of components within the fryer to be minimised.

An air guiding element 20 is located above the basket 14 in an upper part of the fryer 1. In this example, the air guiding element 20 is formed on an internal surface of the lid 18. In other examples, the air guiding element 20 may be formed separate from the lid 18. The air guiding element 20 is dimensioned and constructed so as to direct airflow in a downward direction through the basket 14. In further examples, the air guiding element 20 may be formed by the shape of the lid 18 itself, such that the shape of the lid 18 may be configured to direct airflow in a downward direction through the basket 14.

Figure 2:
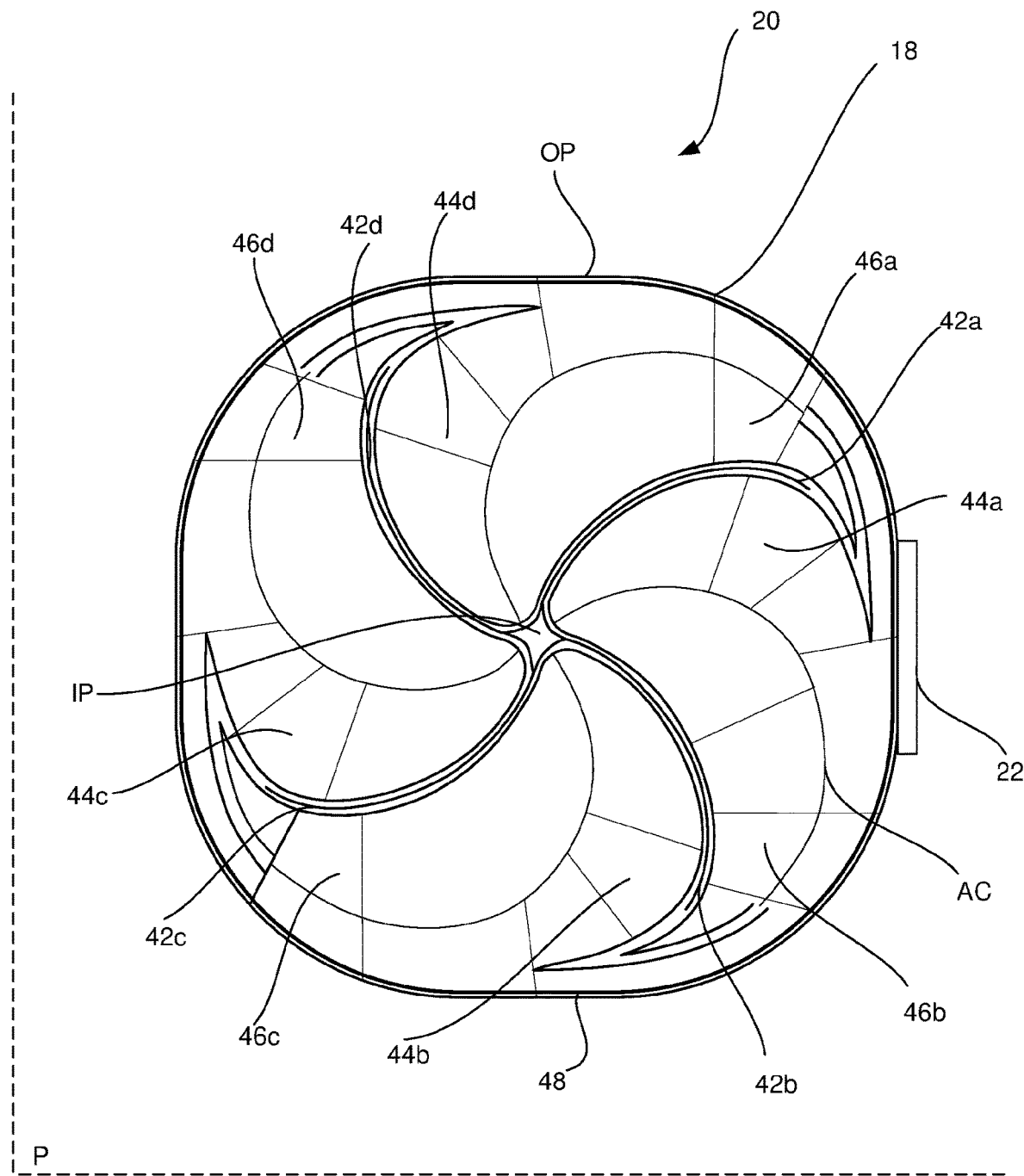
FIG. 2 is a bottom view of an example air guiding element.

FIG. 2 shows an example air guiding element 20, viewed upwards from the inside of the cooking chamber 34 of the flyer. The air guiding element 20 is formed in the lid 18 of the fryer. The air guiding element 20 comprises a plurality of air-deflecting arms 42 arranged symmetrically and extending in a horizontal plane P between an inner part IP and an outer part OP of the air guiding element 20. In the present example, the air guiding element has four deflecting arms 42a, 42b, 42c and 42d, arranged every 90 degrees. The inner part IP corresponds to the centre of the air guiding element. If the air guiding element 20 is circular in shape, the inner part is the centre of the corresponding circle. The outer part OP corresponds to the outer extremity of the air guiding element 20. More generally, a number of at least two air-deflecting arms 42 can similarly be arranged. A seal 48 is arranged around the circumference of the outer part OP of the lid 18, for sealing engagement with the housing 2 of the fryer 1.

Figure 4A:
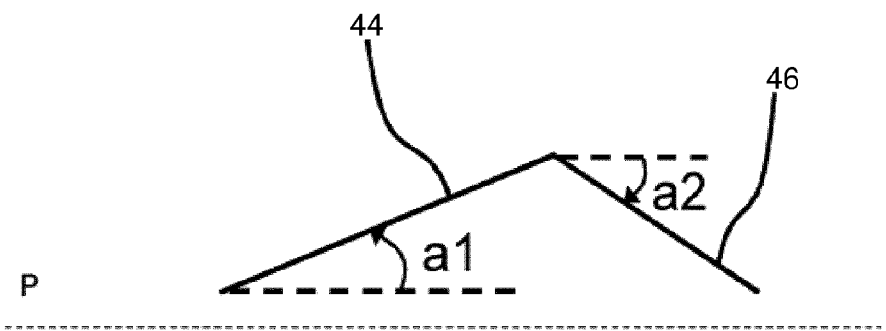
FIG. 4a shows a cross-section through a first example air deflecting arm of the air guiding element.
Figure 4B:
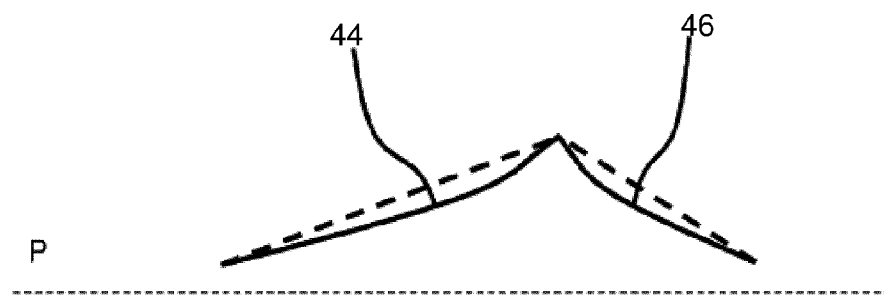
FIG. 4b shows a cross-section through a second example air deflecting arm of the air guiding element.

The air-deflecting arms 42 also comprise a first surface 44 being inclined with a positive angle a1 compared to the horizontal plane P, and a second surface 46 being inclined with a negative angle a2 compared to the horizontal plane P, as illustrated in FIG. 4a, which shows a vertical cross-section through an air-deflecting arm 42. For example, the absolute value of the positive angle a1 and the negative angle a2 is in the range 10-60 degrees relative to the horizontal plane P. In another example illustrated in FIG. 4b, the first surface 44 and the second surface 46 have a concave curvature facing opposite the horizontal plane P.

In the present example, the four deflecting arms 42a, 42b, 42c, 42d have first surface 44a, 44b, 44c, and 44d, respectively, and have second surface 46a, 46b, 46c, and 46d, respectively.

The air-deflecting arms 42 are such that the second surface 46 of a given air-deflecting arm 42 and the first surface 44 of an air-deflecting arm 42 consecutive to the given air-deflecting arms 42 intersect to form a concave air channel AC extending between the outer part OP and the inner part IP. In the present example, with four deflecting arms 42a, 42b, 42c and 42d, the first surface 44a, 44b, 44c, and 44d intersect with the second surface 46a, 46b, 46c, and 46d, respectively, to form four separate concave air channels AC.

Figure 3:
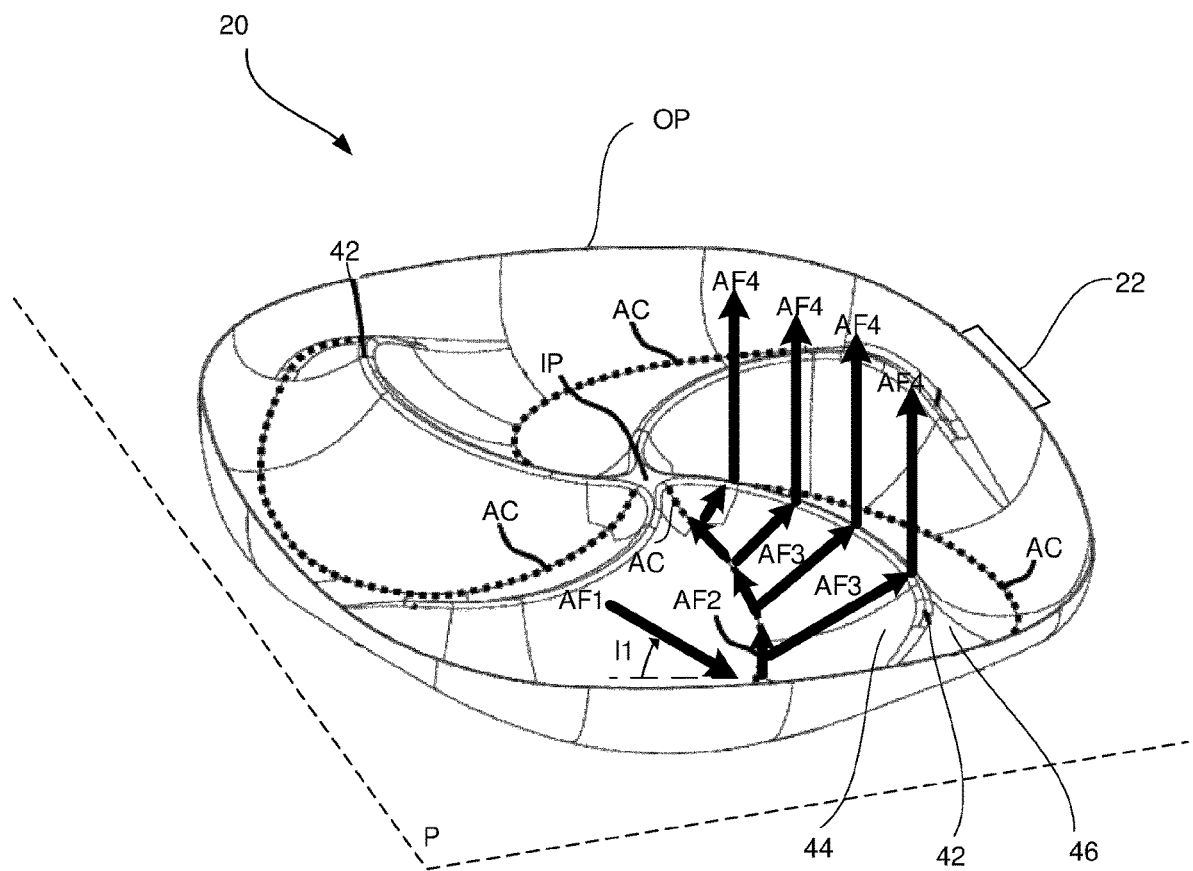
FIG. 3 is a three-dimensional view of the air guiding element as illustrated in FIG. 2.

FIG. 3 shows a three-dimensional view of an air guiding element 20 according to the invention. It can be seen that the concave air channel AC extending between the outer part OP and the inner part IP takes the shape of a gutter or furrow. FIG. 3 also illustrates air flow behaviour with respect to the air guiding element 20. An input air flow AF1 is directed towards the air guiding element 20 in a vertical plane, which would be vertically upwards when the air guiding element 20 is positioned in the fryer 1. The air flow AF1 may have possible inclination having angle I1 compared to the horizontal plane P and towards the outer part OP of the air guiding element 20. The concave air channel AC directs a portion AF2 of the input air flow AF1 towards the inner part IP of the air guiding element 20. As a result, each of the first surface 44 receives air flow components AF3 along its length that can be further redirected outward towards the top of the air deflecting arm 42 due to the inclination of the first surface 44. Air flow components AF4 are directed vertically away from the air guiding element 20, in a vertically downward direction in the fryer 1. This also results in the vertical air flow components AF4 being evenly distributed between the outer part OP and the inner part IP of the air-guiding element 20.

The bottom of the concave air channel AC has an elevation compared to the horizontal plane P, which varies between the outer part OP and the inner part IP. Advantageously, the elevation increases towards the inner part IP. This characteristic is illustrated in FIG. 3. In other examples, the elevation may decrease towards the inner part IP. For example, the entire length of the concave air channel AC may have a decreasing elevation. In further examples, the elevation may increase between the outer part OP and an intermediate area along the concave air channel AC, and decrease between this intermediate area and the inner part IP. For example, the intermediate area may be situated at a distance compared to the inner part IP being in the range 10-50% of the length between the inner part IP and the outer part OP.

In an example, the vertical projection of the bottom part of the concave air channel AC on the horizontal plane P is at equal distance between two consecutive air-deflecting arms 42. The span of the air-deflecting arms 42 may have a value in the range 80-100% of the length between the inner part IP and the outer part OP. The air-deflecting arms 42 may converge to the inner part IP to form an upper extremity at the inner part IP. The air-guiding element 20 may further comprise a curved portion surrounding the periphery of the outer part OP.

FIG. 5a shows a three-dimensional view of an example fan 4 used in the fryer of FIG. 1. As described previously, the fan 4 comprises a base plate 38 and a side wall 30 extending axially upwards from the base plate 38. The side wall 30 extends around the circumference of the base plate 38. The fan 4 comprises a plurality of fan blades 50. The plurality of fan blades 50 are arranged in the side wall 30 of the fan 4 and are symmetrically arranged around the central axis. The fan 4 further comprises an air guide ring 28 located radially inward of the side wall 30. The air guide ring 28 comprises a plurality of openings 40 which are configured to guide airflow toward the fan blades 50. The fan 4 further comprises a central hub 52 configured to be coupled to the drive shaft 8 of the motor 6.

In this example, the air guide ring 28 comprises a plurality of fins 32. Each of the plurality of fins 32 extends circumferentially around the air guide ring 28. The fins 32 are arranged in series in an axial direction of the air guide ring 32. The plurality of openings 40 are formed by gaps between adjacent fins 32. In other examples, the fins 32 may only partially extend around the circumference of the air guide ring 28.

FIG. 5b shows a partial cross-section taken along the line A-A of the fan 4 of FIG. 5a. Each of the fins 32 of the air guide ring 28 extend from an inner surface to an outer surface of the air guide ring. Each fin 32 extends at an angle α relative to the central axis of the air guide ring 28. For ease of reference, in FIG. 5b, each fin 32 is shown to extend an angle α relative to a line C-C, which is parallel to the central axis of the air guide ring 28. The angle of the fins 32 help to guide airflow toward the fan blades 40. In particular, the fins 32 act to prevent downward flowing air from the air guiding element 20 from turning back upwards, before the air has passed through food items 10 within the basket 14. In order to ensure that sufficient airflow is provided along the entire axial length of the fan 4, the openings 40 of the air guide ring 28 are dimensioned to allow air flow to reach the base plate 38 of the fan 4. In this example, the angle α of the fins 32 progressively increases along the axial length of the fan 4, such that the angle α increases towards the base plate 38. Fins 32 which are further from the base plate 38 have a smaller angle α than fins 32 which are closer to the base plate 38. The fin 32 adjacent to the base plate 38 may be angled perpendicular to the central axis of the air guide ring 28.

The upper surface 36 of the base plate 38 may be tapered from the centre of the base plate 38 to an outer edge proximal to the air guide ring 28, such that the centre of the upper surface 36 forms an upper extremity of the upper surface 36 of the base plate. The upper surface 36 may be angled with an angle θ to a horizontal plane, from the central axis to a radial extent. The angle θ may range from 2-15 degrees. The upper surface 36 of the base plate 38 may therefore have a substantially conical profile. The angle θ of the upper surface 36 allows any residue or fat from the food items to run off and collect at its periphery during rotation of the fan 4. In addition, the angle θ of the upper surface 36 may also help air to flow radially outwards from the centre, whilst the fan 4 is rotating.

Figures 6A, 6B, 6C:
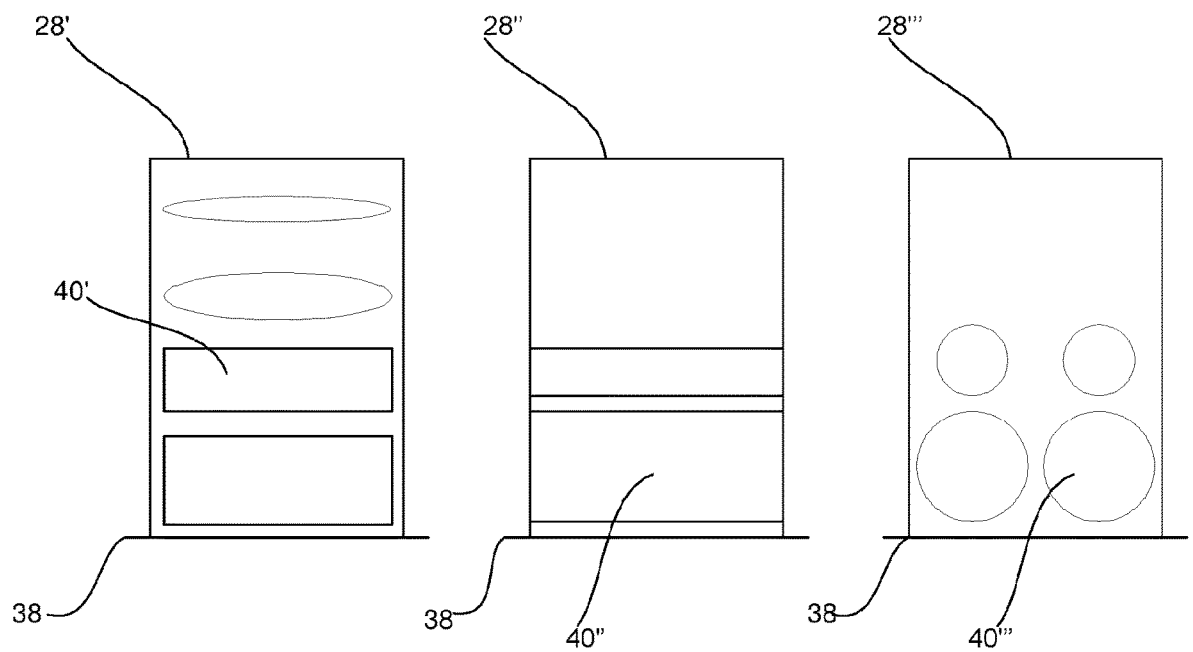
FIGS. 6a, 6b, and 6c show various alternative arrangements of openings for an example fan used in the first embodiment of the invention.

FIGS. 6a, 6b and 6c show segments of other example air guide rings 28, which have different arrangements of openings 40. It is advantageous to have a large opening 40 in the air guide ring 28 proximal to the base plate 38 and have a small or no opening 40 in the air guide ring 28 distal from the base plate 38. This ensures that airflow is forced to flow downwards to the bottom of the fan 4, such that sufficient airflow flows through the food items 10 in the basket 14.

FIG. 6a shows an example air guide ring 28' which has openings 40' of progressively increasing cross-sectional area from an upper region of the air guide ring 28' to a lower region proximal to the base plate 38. FIG. 6a also shows that the openings 40' may also be of different shape in different regions of the air guide ring 28'. In this example, openings 40' in the upper region of the air guide ring 28' have an oval shape, and openings 40' in the lower region of the air guide ring 28' have a rectangular shape. FIG. 6b shows another example air guide ring 28", in which no openings are provided in an upper region. Rectangular shaped openings 40" are provided in the lower region, with the opening 40" adjacent to the base plate 38 having the greatest cross-sectional area. FIG. 6c shows a similar example air guide ring 28'" to that shown in FIG. 6b, instead using circular shaped openings 28'".

As discussed previously, the air guide ring 28 directs airflow to the fan blades 50. The air guide ring 28 also serves a secondary purpose of preventing fat and oil from food items 10 from being blown onto the heater 24 and producing smoke. The air guide ring 28 is only partially open due to the openings 40 for allowing airflow to pass through to the fan blades 50. The remaining portions of the air guide ring 28 serve as a barrier and reduce the possibility of fat and oil reaching the heater 24 positioned outside the fan 4.

In a cooking operation, the food items 10 are placed into the basket 14 by the user. The lid 18 of the air-based fryer 1 is opened and the basket 14 is lowered into and mounted in the cooking chamber 34. In the example shown in FIG. 1, at least a portion of the basket 14 is mounted within the internal volume of the fan 4, formed by the side wall 30 and base plate 38. The lid 18 is subsequently closed to seal the cooking chamber 34. When the fryer 1 is turned on, the heater 24 is activated and the motor 6 is activated to rotate the fan 4. The fan 4 may be configured to rotate at speeds less than 2500 rpm. Preferably, the fan is configured to rotate at speeds in the range of 300-800 rpm. As the fan 4 rotates, air is circulated in the cooking chamber 34. Airflow AF is pushed radially outward from the centre of the fan 4 towards the air guide ring 28. Airflow AF passes through the openings 40 in the air guide ring 28 to the fan blades 50. As discussed previously, the openings 40 are arranged to direct airflow AF downwards to the lower part of the fan 4. Air is then pushed radially outwards by the fan blades 50 and across the heater 24. The heater 24 heats the circulating air. After passing over the heater 24, airflow continues to flow radially outward into a channel formed between the heater 24 and the housing 2. Air flows upward through the channel towards the air guiding element 20 located in the lid 18 of the fryer 1. As discussed previously, the air guiding element 20 comprises air deflecting arms 42 configured to deflect air vertically downwards into the cooking chamber 34. As illustrated in FIG. 1, the airflow is directed downwards into the basket 14. The air guiding element 20 also creates sufficient pressure to push the hot air through the food items 10 in order to cook the food items 10. After passing through the food items 10, the air flows through the basket 14 and through the openings 40 in the air guide ring 28 again. Airflow AF continues to circulate in this direction to cook the food items 10.

By using a fan 4 with a larger diameter than the basket 14, it is possible to achieve a high amount of airflow through the food items 10. This enables the food items 10 to be cooked evenly, potentially without requiring any manual shaking or agitation of the food items 10 in the basket 14. It is also possible to use a relatively low fan speed to deliver this high airflow. The low fan speed results in less noise being produced by the fryer 1. In addition, the high airflow means that it is possible to use a relatively low heater temperature to deliver sufficient heat energy to the food items 10 to be cooked.

Figure 7:
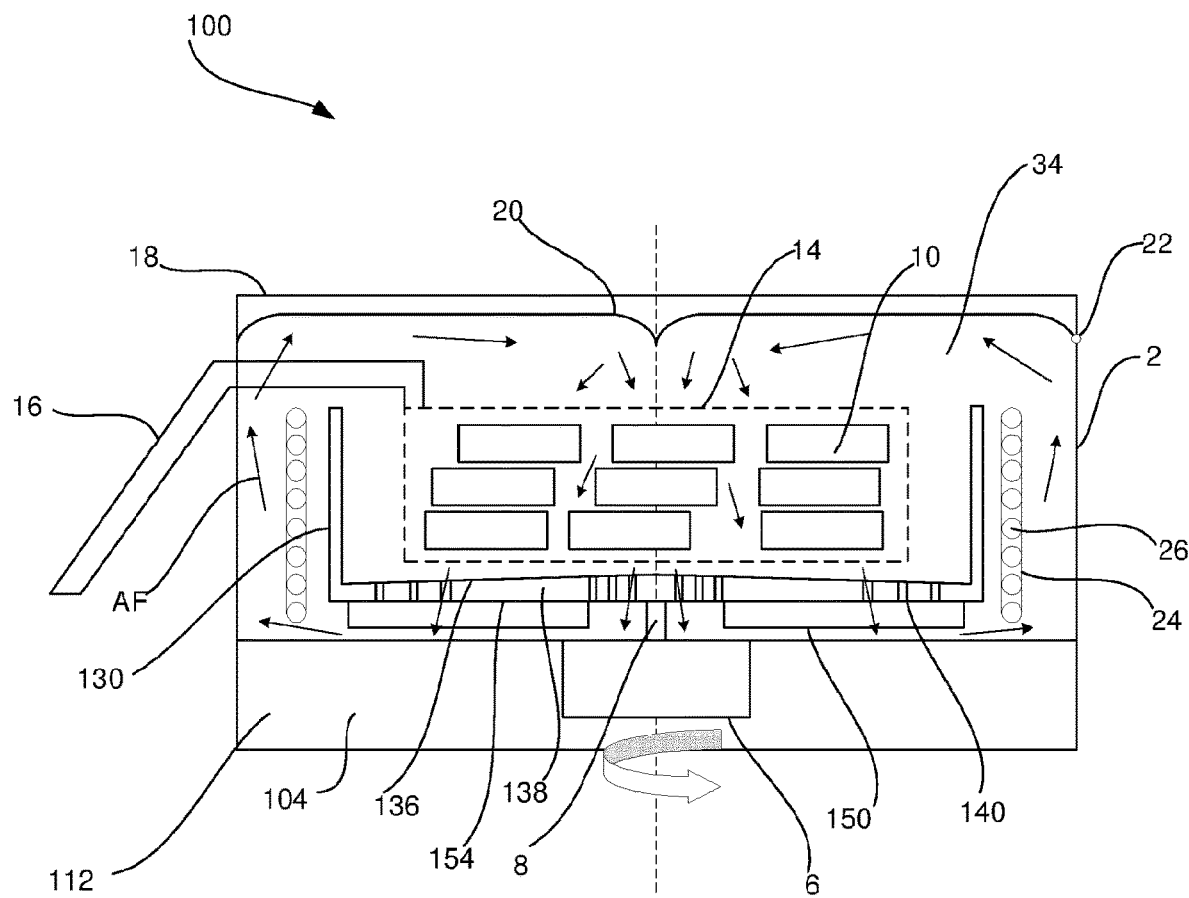
FIG. 7 is a cross-section of an example air-based fryer according to a second embodiment of the invention.

FIG. 7 shows an air-based fryer 100 according to a second embodiment of the present invention. The fryer 100 comprises similar features to that of the first embodiment as previously described, with like reference numerals indicating like features. It differs in that it comprises a different fan structure.

Similar to the first embodiment, the fan 104 has a pan-like shape, comprising a base plate 138 and a side wall 130 extending axially upwards from the base plate 138. The side wall 130 extends around the circumference of the base plate 138. However, rather than being formed in the side wall, the plurality of fan blades 150 in this embodiment are formed on a lower surface 154 of the base plate 138. The fan blades 150 are symmetrically arranged around the central axis. The fan 104 further comprises a plurality of ventilating openings 140 formed in the base plate 138. The ventilating openings 140 extend from an upper surface 136 through to a lower surface 154 of the base plate 138. The ventilating openings 140 allow air to flow from the basket 14 and downwards through the fan 104 to the fan blades 150 on the lower surface 154 of the fan 104.

Figure 8:
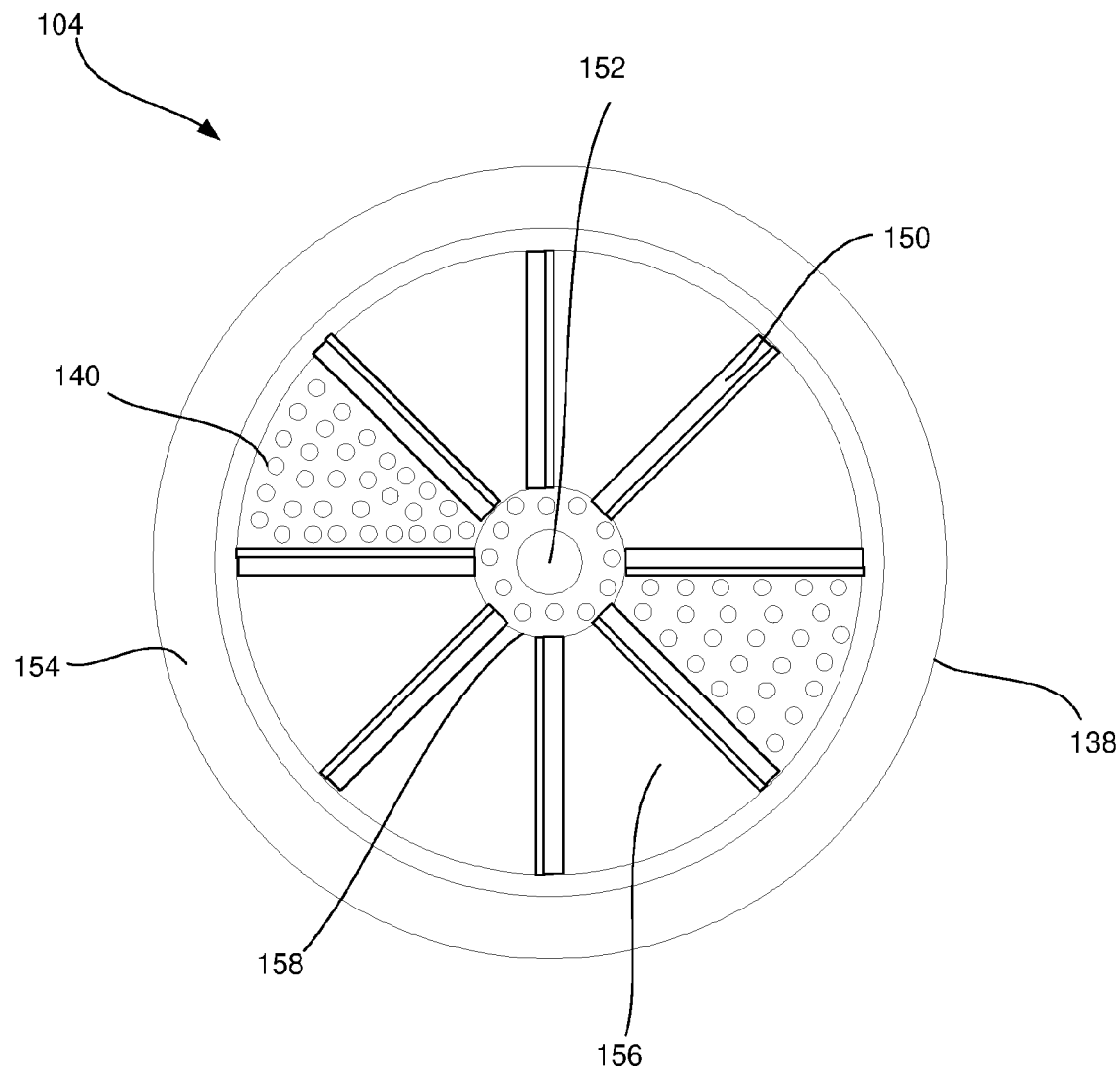
FIG. 8 is a bottom view of an example fan used in the second embodiment of the invention

FIG. 8 shows a bottom view of an example fan 104 used in the fryer 100 of FIG. 7. As described previously, the fan 104 comprises a base plate 138 and a side wall 130 extending axially upwards from the base plate 138. The side wall 130 extends around the circumference of the base plate 138. The fan 104 comprises a plurality of fan blades 150. The fan blades 150 are formed on the lower surface 154 of the base plate 138. The fan blades 150 may be symmetrically arranged around the central axis of the fan 104. The fan blades 150 extend between an inner part and an outer part of the lower surface 154. In this example, the fan 104 comprises eight fan blades 150, with 45 degrees angular separation between adjacent blades. In this example, the fan blades 150 divide the base plate 138 into eight segments 156 with a central portion 158. In other examples, a greater or smaller number of fan blades 150 may be used. The fan 104 comprises a hub 152 located in the central portion 158. The hub 152 is configured to be coupled to the drive shaft of a motor.

As described previously, the fan 104 comprises a plurality of ventilating openings 140 formed in the base plate 138. The ventilating openings 140 extend from an upper surface 136 through to a lower surface 154 (i.e. through the thickness) of the base plate 138. The ventilating openings 140 allow air to flow downwards through the fan 104. The ventilating openings 140 may be small in size to allow only air to pass through and prevent fat or debris from falling through the base plate 138. In this example, the ventilating openings 140 are formed in the central portion and in the segments of the base plate 138. In other examples, the ventilating openings 140 may be formed in other portions of the lower surface 154 of the base plate 138. In this example, the ventilating openings 140 are only formed in part of the lower surface 154 of the base plate 138, but in other examples, the ventilation openings 140 may be formed in substantially the whole of the lower surface 154 of the base plate 138.

The sidewall 130 and baseplate 138 of the fan ensure that fat and oil from food items is prevented from being blown onto the heating element 24 and producing smoke. The base plate 138 is only partially open due to the ventilating openings 140 which allow only airflow to pass through to the fan blades 150 and prevent fat and oil from dripping down through the base plate 138.

As the fan 104 rotates, air is circulated in the cooking chamber 34. Airflow AF is pushed downward through the fan 104 via the ventilating openings 140. Air is then pushed by the fan blades 150 out from underneath the fan 104 and across the heater 24. The heater 24 heats the circulating air. After passing over the heater 24, air flows upward into a channel formed between the heater 24 and the housing 2. Air flows upward through the channel towards the air guiding element 20 located in the lid 18 of the fryer 100. As discussed previously, the air guiding element 20 comprises air deflecting arms 42 configured to deflect air vertically downwards into the cooking chamber 34. As illustrated in FIG. 7, the airflow is directed downwards into the basket 14, where the hot air passes over and cooks the food items 10. After passing through the basket 14, the air flows through the ventilating openings 140 in the fan 104 again. Airflow continues to circulate in this direction to cook the food items.

Figure 9:
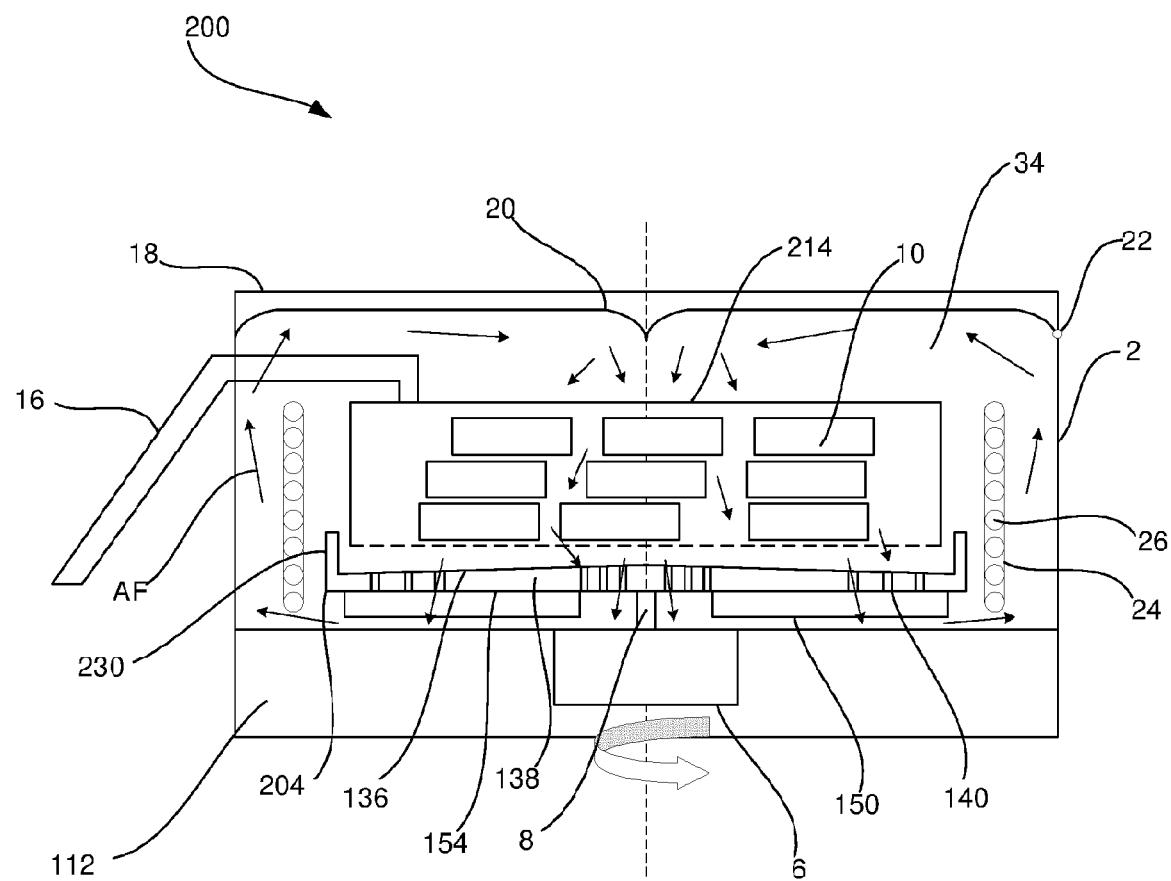
FIG. 9 is a cross-section of an example air-based fryer according to a third embodiment of the invention.

FIG. 9 shows an air-based fryer 200 according to a third embodiment of the present invention. The fryer 200 comprises similar features to that of the second embodiment as previously described, with like reference numerals indicating like features. It differs in that it comprises a different fan structure and a different basket structure.

The basket 214 comprises side walls which are non-air permeable and an air-permeable base to allow circulating air to pass through. For example, the base of the basket 214 may be formed from a mesh-type material and the side walls of the basket 214 may be solid. Therefore the basket 214 allows air to flow through the base of the basket 214 to the fan 204 in a cooking operation.

The fan 204 is similar to the fan 104 of the second embodiment, differing in that the sidewall 230 extends only partially upwards from the base plate 138, and does not extend upwards along the height of the basket 214 when mounted in the cooking chamber 34. The sidewall 230 is configured to catch any residue or fat dropping through the basket 214 from the food items 10 as the fan 204 rotates. By using a shorter sidewall 230, the mass of the fan 204 may be reduced and therefore the energy required to rotate the fan 204 may be reduced. In other examples, the fan 204 may not have a sidewall 230. The fan 204 may instead be provided with a channel or trough at or towards an outer perimeter of the base plate 138 which collects any residue or fat.

Figure 10:
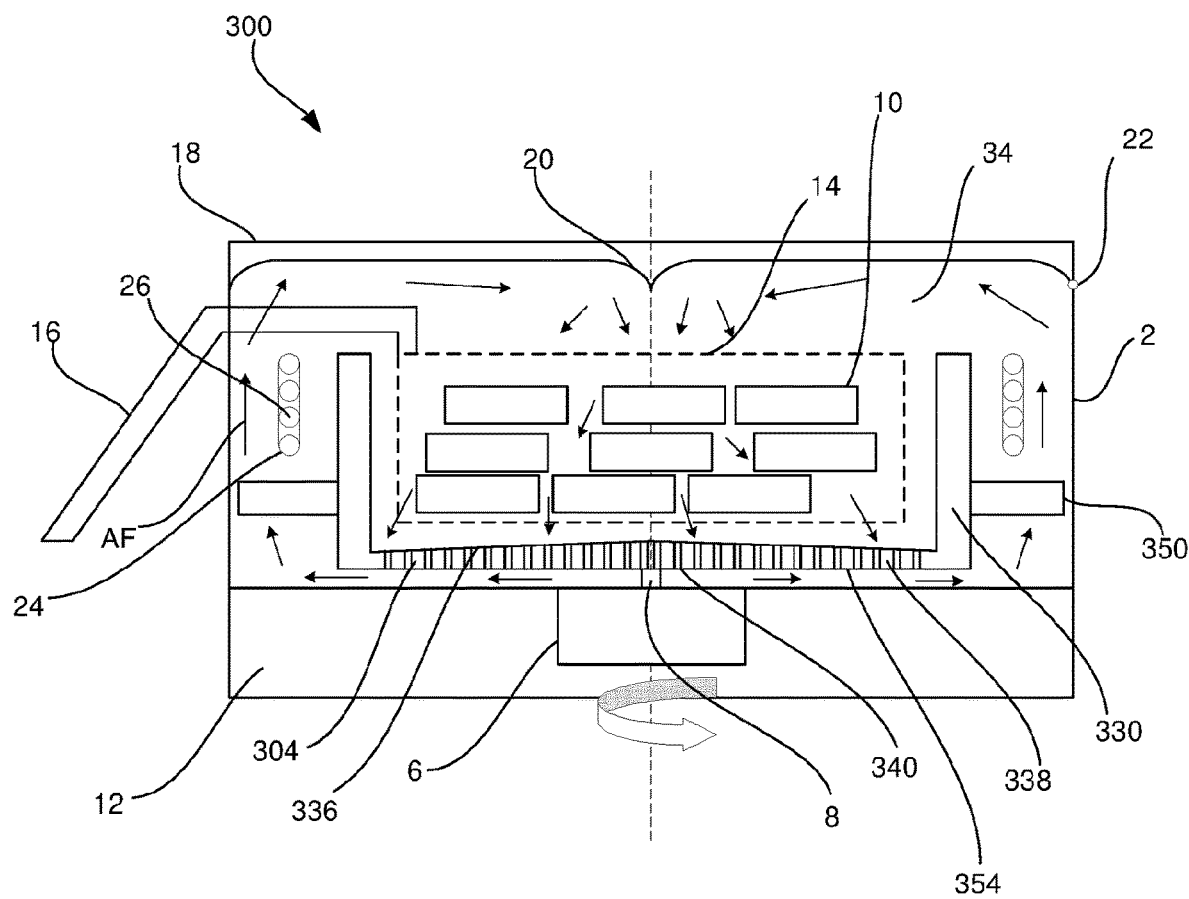
FIG. 10 is a cross-section of an example air-based fryer according to a fourth embodiment of the invention.

FIG. 10 shows an air-based fryer 300 according to a fourth embodiment of the present invention. The fryer 300 comprises similar features to that of the first and second embodiment as previously described, with like reference numerals indicating like features. It differs in that it comprises a different fan structure.

Similar to the first and second embodiments, the fan 304 has a pan-like shape, comprising a base plate 338 and a side wall 330 extending axially upwards from the base plate 338. The side wall 330 extends around the circumference of the base plate 338. The plurality of fan blades 350 are formed around the exterior of the side wall 330 and extend radially outward from the sidewall. The fan blades 350 are symmetrically arranged around the central axis of the fan 304. The fan 304 may be an axial fan. The fan blades 350 may extend radially outward up to the wall of the housing 2.

The fan 304 further comprises a plurality of ventilating openings 340 formed in the base plate 338. The ventilating openings 340 extend from an upper surface 336 through to a lower surface 354 of the base plate 338 (i.e. through the thickness). The ventilating openings 340 allow air to flow from the basket 14 and downwards through the fan 304. The ventilating openings 340 may be formed across substantially the whole of the base plate 338 or only in portions of the base plate 338. The fan blades 350 on the exterior of the side wall 330 are configured to circulate air within the cooking chamber 34.

As the fan 304 rotates, air is circulated in the cooking chamber 34. Airflow AF is pushed downward through the fan 304 via the ventilating openings 340. Air then flows radially outward under the fan and subsequently upwards. The heater 24 is positioned above the fan blades 350 in the cooking chamber 34. In other examples, the heater 24 may be positioned below the fan blades 350. The air is then pushed by the fan blades 350 upwards across the heater 24. The heater 24 heats the circulating air. After passing over the heater 24, air continues to flow upward towards the air guiding element 20 located in the lid 18 of the fryer 300. As discussed previously, the air guiding element 20 comprises air deflecting arms 42 configured to deflect air vertically downwards into the cooking chamber 34. As illustrated in FIG. 10, the airflow is directed downwards into the basket 14, where the hot air passes over and cooks the food items 10. After passing through the basket 14, the air flows through the ventilating openings 340 in the fan 304 again. Airflow continues to circulate in this direction to cook the food items.

Figure 11:
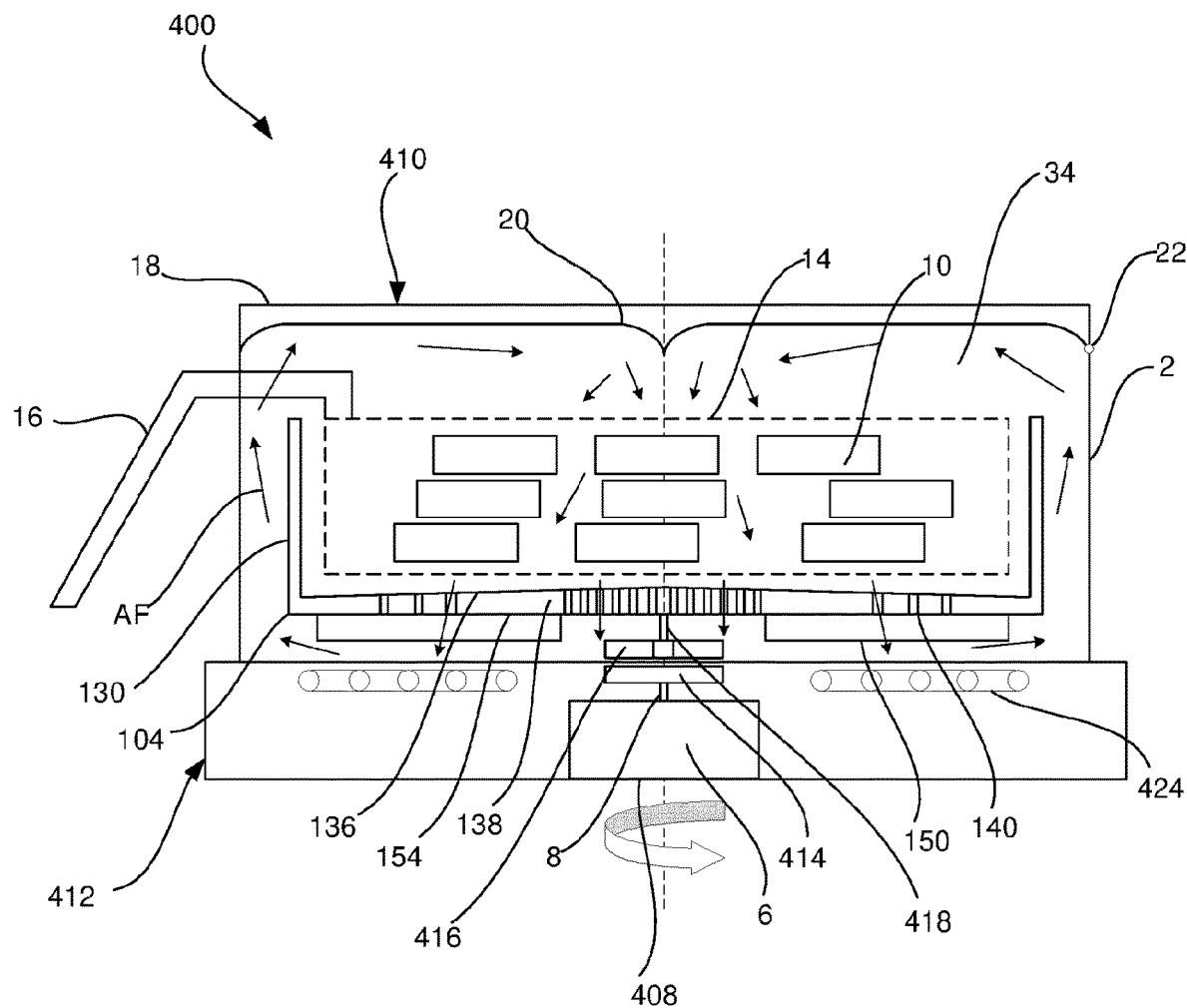
FIG. 11 is a cross section of an example air-based fryer according to a fifth embodiment of the invention.

FIG. 11 shows an air-based fryer 400 according to a fifth embodiment of the present invention. The fryer 400 comprises similar features to that of the first, second, third and fourth embodiment as previously described, with like reference numerals indicating like features. It differs in that it comprises a different drive mechanism for the fan and a different heating arrangement.

The fryer 400 comprises a fryer unit 410 and a base unit 412. The fryer unit 410 comprises a housing 2 defining a cooking chamber 34, in which a basket 14 supporting food items 10 can be mounted in a cooking operation. The base unit 412 contains a motor drive unit 408 and a heater 424. The fryer unit 410 is separate from the base unit 412, such that the fryer unit 410 can be placed onto the base unit 412 for a cooking operation.

The motor drive unit 408 comprises a motor 6 and a motor coupling 414 coupled to the drive shaft 8 of the motor 6. The fryer unit 410 comprises a fan 104 for circulating air within the fryer. In this example, the fan 104 is shown as the example fan described in relation to the second embodiment. In other examples, any suitable fan structure may be provided for circulating air within the fryer, including the example fans described in relation to the first, third, and fourth embodiments. The fan 104 comprises a fan shaft 418, which is coupled to a fan coupling 416. Each of the motor coupling 414 and the fan coupling 416 may be a magnetic coupling. The magnetic attraction between the motor coupling 414 and the fan coupling 416 causes the motor 6 to be contactlessly coupled to the fan 104 for rotational movement. The motor 6 is configured to rotate the motor coupling 414 and the magnetic attraction causes the fan coupling 416 to rotate correspondingly and drive the rotation of the fan 104.

The heater 424 is located within the base unit 412. The heater 424 is positioned close to the upper surface of the base unit 412 which contacts the lower surface of the fryer unit 410 in use. The heater 424 may be an induction coil configured to heat the housing of the fryer unit 410 or the fan 104 via magnetic induction, which transfers heat to the circulating air within the cooking chamber 34. In other examples, the induction coil may be configured to heat a component in the fryer unit 410 formed from or containing a ferrous metal, which can transfer heat to the circulating air within the cooking chamber 34. In other examples, the heater 424 may be a resistance heater or a radiation heater which may transfer heat from the base unit 412 to the fryer unit 410 to heat the air circulating within the cooking chamber 34.

To commence a cooking operation, the fryer unit 410 is placed on the base unit 412. Food items 10 are loaded into the basket 14 mounted in the cooking chamber 34. When the fryer 400 is turned on, the heater 424 is activated and the motor 6 is activated to rotate the motor coupling 414. As the motor coupling 414 rotates, the magnetic coupling drives the rotation of the fan coupling 416 and causes the fan 104 to rotate and circulate air within the cooking chamber 34. The heater 424 is configured to transfer heat to the air circulating within the cooking chamber 34. As discussed previously, the air guiding element comprises air deflecting arms 42 configured to deflect air vertically downwards into the cooking chamber 34. The hot air passes over and cooks the food items 10.

In other examples, the coupling between the motor 6 and the fan 104 may not be magnetic and may instead be formed by a suitable mechanical detachable connection, such as a splined connection, which allows quick and simple detachment and connection of the fryer unit 410 to the base unit 412.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An air-based fryer, comprising:
   a housing to define a cooking chamber;
   a basket to support food items to be cooked, the basket is configured to be mounted in the cooking chamber during a cooking operation;
   an air guiding element located above the basket;
   a fan to circulate air within the cooking chamber; and
   a heater to heat the air circulated by the fan,
   wherein the heated air flows upwards towards the air guiding element through a channel formed between the heater and the housing,
   wherein the air guiding element is configured to deflect the heated air vertically downwards into the basket,
   wherein the fan comprises:
   a base plate;
   a circumferential side wall extending axially from an upper surface of the base plate; and
   a plurality of fan blades, and
   wherein the basket is further configured to be at least partially mounted within a volume formed by the base plate and the side wall of the fan.

2. The air-based fryer according to claim 1, wherein the plurality of fan blades are formed in the side wall and arranged circumferentially around an axis of the fan.

3. The air-based fryer according to claim 1, wherein the fan comprises an air guide ring radially inward of the plurality of fan blades, the air guide ring comprising a plurality of openings configured to direct air flow radially outward to the plurality of fan blades.

4. The air-based fryer according to claim 3, wherein the air guide ring further comprises a plurality of circumferential fins arranged axially along the length of the air guide ring, each opening of the plurality of openings being formed between adjacent fins.

5. The air-based fryer according to claim 4, wherein fins arranged closer to the base plate extend at an angle (a) relative to an axis of the air guide ring that is greater than that of fins arranged further from the base plate.

6. The air-based fryer according to claim 3, wherein openings closer to the base plate have a greater cross-sectional area than openings further from the base plate.

7. The air-based fryer according to claim 1, wherein the plurality of fan blades are formed on a lower surface of the base plate, the lower surface being opposed to the upper surface of the base plate, the plurality of fan blades being arranged symmetrically, and being extended between an inner part and an outer part of the lower surface.

8. The air-based fryer according to claim 7, wherein the base plate further comprises a plurality of ventilating holes extending from the upper surface to the lower surface to direct air flow downward from the basket to the plurality of fan blades.

9. The air-based fryer according to claim 1, wherein the heater comprises at least one heating element arranged around the fan.

10. The air-based fryer according to claim 9, wherein the at least one heating element comprises one of a wire heating element, a tubular heating element, or a coiled heating element.

11. The air-based fryer according to claim 1, wherein the air guiding element comprises a plurality of air-deflecting arms arranged symmetrically and extended in a horizontal plane between an inner part (IP) and an outer part (OP) of said air guiding element.

12. The air-based fryer according to claim 1, wherein the housing comprises a lid which is configured to be opened in order to place the food items inside the cooking chamber, and closed to seal the cooking chamber, the air guiding element being formed on an inner surface of the lid.

13. The air-based fryer according to claim 1, wherein the upper surface of the base plate is tapered such that the upper surface slopes downward from a centre of the base plate to the side wall.

* * * * *